United States Patent [19]
Ichino et al.

[11] Patent Number: 6,095,957
[45] Date of Patent: Aug. 1, 2000

[54] ROLL FOR HOT ROLLING HAVING ENHANCED ABRASION RESISTANCE AND REDUCED CARBIDE SEGREGATION

[75] Inventors: Kenji Ichino; Tomoya Koseki; Takaaki Toyooka; Kohji Yuda, all of Aichi, Japan

[73] Assignee: Kawasaki Steel Corporation, Japan

[21] Appl. No.: 09/011,152

[22] PCT Filed: Jun. 16, 1997

[86] PCT No.: PCT/JP97/02062

§ 371 Date: Jan. 29, 1998

§ 102(e) Date: Jan. 29, 1998

[87] PCT Pub. No.: WO97/48505

PCT Pub. Date: Dec. 24, 1997

[30] Foreign Application Priority Data

Jun. 18, 1996 [JP] Japan ..................................... 8-177280
Aug. 23, 1996 [JP] Japan ..................................... 8-240007
Oct. 30, 1996 [JP] Japan ..................................... 8-303532

[51] Int. Cl.[7] .................................................. B23P 15/00
[52] U.S. Cl. ............................................. 492/54; 492/58
[58] Field of Search .......................................... 492/54, 58

[56] References Cited

U.S. PATENT DOCUMENTS 3,929,518 12/1975 Akahori et al. .
5,316,596 5/1994 Kataoka .
5,674,171 10/1997 Ichino et al. ............................... 492/53

*Primary Examiner*—Irene Cuda
*Attorney, Agent, or Firm*—Austin R. Miller

[57] ABSTRACT

High-quality high-speed steel roll which is markedly excellent in abrasion resistance and free of carbide segregation even in the case of production by centrifugal casting of economical benefit; it comprises an outer layer containing, by all weight ratios, C; 2.4–2.9%, Si; not more than 1%, Mn; not more than 1%, Cr; 12–18%, Mo; 3–9%, V; 3–8% and Nb; 0.5–4%, and meeting with the following equations (1) and (2) at one time, $$0.27 \leq Mo\ (\%)/Cr\ (\%) \leq 0.7 \quad (1)$$

$$C\ (\%) + 0.2 \cdot Cr\ (\%) \leq 6.2 \quad (2)$$

the outer layer further containing as the balance Fe and unavoidable impurities.

10 Claims, 5 Drawing Sheets

ROLL FOR HOT ROLLING HAVING ENHANCED ABRASION RESISTANCE AND REDUCED CARBIDE SEGREGATION

TECHNICAL FIELD

This invention is directed to a roll for use in hot rolling which excels noticeably in abrasion resistance and, even when produced by means of centrifugal casting, achieves low carbide segregation.

BACKGROUND ART

In recent years, the technology of hot rolling has made remarkable progress. This has given an impetus to the development of certain high-quality hot-rolling rolls, each of which has an outer layer composed according to a high-speed steel composition (those rolls being referred to hereinbelow as high-speed steel rolls), the outer layer being capable of affording abrasion resistance to a markedly improved extent that is derivable from addition of V and W in large amounts and from subsequent crystallization of a hard carbide of V and a hard carbide of W (for instance, Japanese Unexamined Patent Publication No. 1-96355, No. 6-145888, No. 4-80344, No. 5-1350, No. 5-5155, No. 8-35033 and the like). Part of such rolls have now been put to practical use.

However, from the points of view of quality rise and efficient productivity concerning rolled products, those environmental conditions under which hot-rolling rolls are employed have become more and more strict, simultaneously with severe surface qualities required for rolled steel plates. Still further improvements, therefore, need to be made with respect to the abrasion resistance and surface quality of such a hot-rolling roll. Owing to incorporation with a variety of alloy components such as V, W, Mo, Cr and so on, a high-speed steel roll has two or more different carbides crystallized depending upon the amount of each element used (those carbides being MC, $M_6C$, $M_7C_3$, $M_2C$, $M_3C$ and so on). In addition, the carbides are formed more increasingly with increases of the amounts of the above alloy elements. This is taken to indicate that there is a strong likelihood of abrasion resistance being further improved in an appropriate range of compositions. However, in the case where many different carbides are caused to form in large amounts in a cast roll so as to attain enhanced abrasion resistance of the latter, such carbides become remarkably segregated during solidification because of their varying levels of crystallization timing and also of their varying specific gravities with the consequence that the resultant roll undergoes, on its surface, patterns of segregation in the course of hot rolling. In particular, the roll when applied to one for a subsequent finish mill leaves the problem that a steel plate to be rolled suffers impaired surface quality.

Here, in the production of a high-speed steel roll through a centrifugal casting method of economical advantage in respect of production cost, this method requires applied centrifuge force and involves prolonged solidification, thus tending to cause carbides to be more frequently segregated than other methods. On the other hand, when a high-speed steel roll is produced by use of a building up welding method or a continuous casting building up method (a high production cost being needed in each such method), an outer layer of the resulting roll can be rapidly solidified, without centrifugal force involved, with eventual protection of the roll against segregation of carbides but to an extent to invite a steep increase in production cost. In order to obviate the foregoing problems, the present inventors have previously made extensive researches on those high-speed steel rolls accruing from production by centrifugal casting (for example, Japanese Unexamined Patent Publication No. 5-1350, No. 8-73977, No. 9-41072 and the like). Experience gained by these inventors teaches that carbides would segregate particularly in a high composition range of Cr in which abrasion resistance could be conspicuously improved. In view of this problem, conventional practice has made it difficult to produce a high-speed steel roll at a low production cost and with a further enhancement in abrasion resistance.

One principal object of the present invention lies in the provision of a high-quality high-speed steel roll which is markedly excellent in abrasion resistance and rather free of carbide segregation even in the case of production by a centrifugal casting method of economical benefit.

DISCLOSURE OF THE INVENTION (1) The hot-rolling roll of the present invention comprises an outer layer containing, by all weight ratios, C; 2.4–2.9%, Si; not more than 1%, Mn; not more than 1%, Cr; 12–18%, Mo; 3–9%, V; 3–8% and Nb; 0.5–4%, and meeting with the following equations (1) and (2) at one time, $$0.27 \leq Mo\ (\%)/Cr\ (\%) \leq 0.7 \tag{1}$$

$$C\ (\%) + 0.2 \cdot Cr\ (\%) \leq 6.2 \tag{2}$$

the outer layer further containing as the balance Fe and unavoidable impurities.

(2) In the hot-rolling roll of the invention, the outer layer further includes, in addition to the main components of item (1) above, one or more components of Ni; not more than 1.5%, Co; not more than 6% and B; not more than 0.1%.

(3) In the hot-rolling roll of the invention, the outer layer further includes, in addition to the main components of items (1) and (2) above, a MC type carbide and a $M_7C_3$ type carbide in their total area of 13–30%.

(4) In the hot-rolling roll of the invention according to item (3) above, the $M_7C_3$ type carbide is present in an area of not less than 6%. (5) The hot-rolling roll of the invention according to items (1) and (2) above further includes an inner layer formed of a spherical graphite cast iron or a graphite steel and held in integrally fusion-bonded relation to the outer layer, the inner layer containing, by all weight ratios, C; 2.5–4.0%, Si; 1.5–3.5%, Mn; not more than 1.5%, Cr; not more than 3%, Mo; not more than 3%, V; not more than 3% and Nb; not more than 2%, and further containing as the balance Fe and unavoidable impurities.

(6) The hot-rolling roll of the invention according to items (1) and (2) above further includes an intermediate layer interposed between the outer layer and the inner layer and held in integrally fusion-bonded relation to the outer and inner layers, the intermediate layer containing, by all weight ratios, C; 0.8–3.0%, Si; 0.3–3.0%, Mn; not more than 1.5%, Cr; not more than 10%, Mo; not more than 4%, V; not more than 5% and Nb; not more than 3%, and further containing as the balance Fe and unavoidable impurities.

(7) In the hot-rolling roll of the invention according to item (6) above, the ratio of the intermediate layer admixed into the inner layer material is in the range of 5–20%.

(8) In the hot-rolling roll of the invention according to item (6) above, the ratio of the intermediate layer admixed into the outer layer material is in the range of 5–50%.

(9) In the hot-rolling roll of the invention according to item (5) or (6) above, either one or both layers of the inner and intermediate layers further include either one or both components of Ni; not more than 5% and Co; not more than 6%.

(10) In the hot-rolling roll of the invention according to item (1) or (2) above, the outer layer is derivable from centrifugal casting.

The phrase "ratio of an outer layer admixed into an intermediate layer material" set forth in item (8) is taken to denote a numerical value used to quantitatively control components of the outer layer that could again melt during casting of the intermediate layer and admix into a coating composition of the intermediate layer. Namely, when a focus is centered on Cr of a less segregative nature, and also when the amount of Cr contained in the outer layer is taken as "a%" by weight, the amount of Cr in the intermediate layer to be cast as "b%" by weight and the amount of Cr in the intermediate layer after being cast as "c%" by weight, the phrase "ratio of the outer layer admixed into the intermediate layer material" is defined as follows:

[ratio of outer layer admixed into intermediate layer material]= $\{(c\% \text{ by weight})-(b\% \text{ by weight})\}/\{(a\% \text{ by weight})-(b\% \text{ by weight})\}\times 100\%$ Furthermore, the phrase "ratio of an intermediate layer admixed into an inner layer material" set forth in item (7) is taken to denote a numerical value used to quantitatively control components of the intermediate layer which again melt during casting of the inner layer and hence admix into a coating composition of the inner layer. To be more specific, when a focus is centered on Cr of a less segregative nature, and also when the amount of Cr contained in the intermediate layer is taken as (c% by weight), the amount of Cr in the inner layer to be cast as (d% by weight) and the amount of Cr in the inner layer after being cast as (e% by weight), the phrase "ratio of the outer layer admixed into the intermediate layer material" is defined as follows:

[ratio of intermediate layer admixed into inner layer material]= $\{(e\% \text{ by weight})-(d\% \text{ by weight})\}/\{(c\% \text{ by weight})-(d\% \text{ by weight})\}\times 100\%$ Additionally, the terms "outer layer material" and "inner layer material" refer respectively to "hot melts prior to casting". By the terms "outer layer" and "inner layer" are meant by such "after being solidified".

BRIEF DESCRIPTION OF THE DRAWINGS

FIGS. 5 (A) and (B) schematically show the roll construction provided in accordance with the invention.

BEST MODE OF CARRYING OUT THE INVENTION

(A) Reasons for Imposing Restriction upon Alloy Elements for Outer Layer

Technical Aspects and Features of the Invention

In leading to the present invention, continued researches have been made, from those viewpoints described below, about a range of compositions that would be capable of simultaneously attaining [a] prevention of carbide segregation, [b] improvement of abrasion resistance to a marked extent and [c] freedom of roll breakage with regard to a high-speed steel roll for hot rolling comprising an outer layer of a high Cr—Mo type composition intermixed with V and Nb. As a result, certain appropriate compositions have now been found which can solve those problems encountered with conventional hot-rolling rolls and mentioned hereinabove.

[a] Prevention of Carbide Segregation (i) In preventing carbide segregation, it has been found effective to minimize the difference between austenite and a carbide in respect of their levels of crystallization timing (crystallization temperature) at a solidification stage and further to cause a carbide to crystallize, which carbide has a specific gravity not differing largely from that of a molten steel, or to refrain from crystallizing a variety of carbides.

(ii) Requirements for provision of a high-speed steel roll showing a conspicuous rise in abrasion resistance are that such roll should have a metallic structure containing a highly hard MC type carbide and a semihard phase-forming eutectic carbide such as $M_6C$, $M_7C_3$, $M_{23}C_6$, $M_2C$, $M_3C$ or the like. In such instance, the abrasion resistance becomes greater as the number of the semihard phase-forming eutectic carbides increases. Many different kinds of eutectic carbides, however, are responsible for promoted carbide segregation as noted above. Importantly, an alloy composition should be designed in which various kinds of carbides are precluded from becoming eutectic.

(iii) Prevention of Eutectic Carbide Segregation

In cast irons of a high Cr content, it is known that in the case of a high-C and high-Cr type composition, a Cr type carbide predominantly of $M_7C_3$ uniformly disperses as a colony-like eutectic carbide in the resulting metallic structure. With this fact taken as a hint, the prevention of carbide segregation has been found in which an $M_7C_3$ type carbide is used to advantage as a semihard phase for a high-speed steel roll.

In the present invention, a desirable compositional range of C; 2.4–2.9% and Cr; 12–18% has been selected in which a $M_7C_3$ type carbide is crystallized in a large amount as a semihard phase. Even in such range, however, it has been found that when C and Cr are so incorporated as to be above a numerical value of 6.2 computed from the equation (%)+0.2·Cr C(%), a needle-like carbide is crystallized in addition to the colony-like $M_7C_3$ type carbide described above. Centrifugal casting of a roll with a composition tending to crystallize a needle-like Cr carbide leads to segregation of both of colony-like and needle-like carbides. Thus, choice has been made of a specific equation of C (%)+0.2 Cr (%)≦6.2. In general, a high-speed steel roll contains W. Addition of W in some instances brings about carbides ($M_6C$, $M_2C$ and so on) differing from a $M_7C_3$ type which would get segregated. A further finding is that because of its considerably large specific gravity, W invites an increased difference between a hot melt and a carbide in regard to their specific gravities, consequently promoting carbide segregation (specific gravity of each element: W; 19.3, Fe; 7.9, Cr; 7.2 and Mo; 10.2) and also deteriorating abrasion resistance. In the practice of the present invention, therefore, W should not be used in such an amount as to permit formation of a W type carbide.

(iv) Prevention of MC Type Carbide Segregation

An MC type carbide composed mainly of V has a smaller specific gravity than a hot melt and poses the problem that when in centrifugal casting, the MC carbide gets centrifugally separated due to its difference in specific gravity as compared to the hot melt. In order to avoid centrifugal separation of the MC type carbide, it is effective to increase the specific gravity of such carbide to thereby decrease the difference between that gravity with respect to the hot melt. In the present invention, the MC type carbide has been modified into a composite carbide of increased specific gravity upon incorporation of Nb and Mo, elements of higher specific gravities, in a V-based MC-type carbide (specific gravities: VC; 5.7, V; 6.1, Nb; 8.6 and Mo; 10.2). Moreover, the MC type carbide has been prevented from centrifugal separation by relying upon a method in which no use is made of W that would act to impart increased specific gravity to a hot melt. To meet with those requirements, a composition is desired which is made up of V; 3–8%, Nb; 0.5–4%, Mo; 3–9% and W; not more than 0.1%.

[b] Marked Improvement in Abrasion Resistance

To achieve such abrasion resistance as required for a high-speed steel roll, an MC type carbide should necessarily be present. Also importantly, a eutectic carbide should be present with a large content in reinforced condition in enhancing abrasion resistance at a noticeably high level. In the present invention, many studies have been made to further remarkably improve the abrasion resistance of the high-speed steel roll within the specific requirements stated above in connection with the prevention of segregation. In consequence, an MC carbide and an $M_7C_3$ type carbide are incorporated respectively in suitable amounts and held in reinforced condition. Namely, the MC and $M_7C_3$ carbides should necessarily be added in an total amount of not smaller than 13% so as to obtain enhanced abrasion resistance. In those compositions to provide such carbides, V; 3–8% and Nb; 0.5–4% are present along with C; 2.4%–2.9% as a source of carbon supply so that a composite type MC carbide of V and Nb is allowed to form, and Cr; 12–18% is also present so that an $M_7C_3$ type carbide is further allowed to form in an appropriate amount. A sudden improvement in abrasion resistance, however, is made unfeasible with reliability when using only the above specified compositions. Further studies have been made in order to enhance abrasion resistance to an extent not to promote segregation. It has been found that the foregoing MC and Cr carbides are modified by appropriate addition of Mo with eventual remarkable enhancement in abrasion resistance. More specifically, Mo when added in an amount of 3–9% becomes concentrated in the MC carbide and in the Cr ($M_7C_3$) carbide, thereby modifying each such carbide into a tough composite carbide. Here, it has been found that Mo needs to be used in a larger content as the content of Cr increases and that abrasion resistance fails to improve when the ratio of Mo (%)/Cr (%) falls short of a numerical value of 0.27. Thus, choice has been made of a specific equation: $0.27 \leq Mo(\%)/Cr(\%)$. It has also been found that when the ratio of Mo (%)/Cr (%) is over a value of 0.7, Mo the amount of is excessive and hence liable to form a eutectic carbide mainly of Mo in a large amount, with the result that carbide segregation is promoted and abrasion resistance impaired. Thus, choice has also been made of a specific equation: Mo (%)/Cr (%)$\leq 0.7$. Even when Mo (%)/Cr (%) is below 0.7, Mo carbide is apt to crystallize. Roll characteristics are not adversely affected so long as Mo/Cr is set to be not larger than 0.7.

[c] Prevention of Roll Breakage

If a high-speed steel roll of a composite type is produced with carbides caused to appear in extremely large amounts so as to achieve improved abrasion resistance, then the roll sometimes becomes broken. The reason for breakage is attributable to excessively increased carbide present on an outer layer of the roll and hence to sharply declined expansion coefficient (since the carbides are of a small linear expansion coefficient, an outer layer abundant in carbide is small in such coefficient). This in turn leads to increased difference between the outer layer and the mating inner layer in respect of thermal expansion and shrinkage, thus resulting in excessively thermally stressed or otherwise broken roll. Based on this finding, critical amounts of carbides have been studied in which such composite roll is prevented against breakage. It has now been found that the MC type carbide and $M_7C_3$ type carbide should be set to be in their total of not more than 30%.

(1) Carbides contents in the outer layer of the roll according to the present invention are defined as follows:

Total Area of 13–30% of MC Type Carbide and $M_7C_3$ Type Carbide in Outer Layer To obtain excellent abrasion resistance, an MC type carbide and an $M_7C_3$ type carbide should necessarily exceed 13% in their total. As already mentioned, however, larger total percentage than 30% make the resulting roll easily breakable.

Content of Not Less Than 6% of $M_7C_3$ Type Carbide in Outer Layer

Both an MC type carbide and an $M_7C_3$ type carbide have their total amount set to be 13–30%. Additionally, the $M_7C_3$ type carbide has an amount of not less than 6%. Such requirements produce not only a sharp rise in abrasion resistance but also an improvement in surface quality as concerns the finished roll or rolled steel plate. Further, those requirements prevent the roll from becoming thermally expanded and hence allow the same to more effectively guide a steel plate. In regard to amounts of the $M_7C_3$ type carbide, below 6% fails to provide those desirable results.

(2) Compositions for the outer layer of the roll according to the present invention are defined as follows:

C; 2.4–2.9%

C is an element essential to carbide formation for improved abrasion resistance. Below 2.4% gives insufficient amounts of carbides, thus failing to attain excellent abrasion resistance. Conversely, above 2.9% leads to excessive amounts of carbides and hence results in segregated carbide.

Cr; 12–18% and C (%)+0.2·Cr (%)$\leq 6.2$

Cr should be used in a content of not smaller than 12% to develop a suitable amount of a colony-like $M_7C_3$ carbide, thereby improving abrasion resistance and surface roughness resistance. Less than 12% causes a reduced amount of a Cr carbide, inviting impaired abrasion resistance and a roughened roll surface. More than 18% of Cr or more than a numerical value of 6.2 as a total of from C (%)+0.2·Cr (%) allows a needle-like Cr carbide to crystallize, and hence involves segregated carbide with the consequence that the finished rolled plate deteriorates in its surface quality. Cr; 12–16% is particularly preferred.

Mo; 3–9% and $0.27 \leq Mo(\%)/Cr(\%) \leq 0.7$

Mo has a role to concentrate in an MC carbide and in an $M_7C_3$ carbide, thereby reinforcing these carbides and also rendering the resultant roll markedly resistant to abrasion. Moreover, Mo is effective in preventing the MC carbide from segregation. To gain these results, Mo should be present in a content of not less than 3% and set to satisfy $0.27 \leq Mo(\%)/Cr(\%)$. On the other hand, above 9% of Mo or above a value of 0.7 as a ratio Mo (%)/Cr (%) develops Mo type carbides in large amounts and hence promotes carbide segregation, eventually causing a sudden decline in abrasion resistance. $0.3 \leq Mo(\%)/Cr(\%) \leq 0.58$ is particularly preferred.

V; 3–8% and Nb; 0.5–4%

V is an element absolutely necessary for forming a hard MC carbide and for achieving abrasion resistance at a certain level called for by a high-speed steel roll. To provide such results, V should be used in a content of not less than 3%. More than 8% is responsible for an increased melting point of a hot melt and hence reduced fluidity of the same and also is adverse to roll production.

Nb is also an element for forming an MC carbide, and this element acts to concentrate Mo in the MC carbide. Addition of Nb modifies the MC carbide into a composite MC carbide of a tough nature (V, Nb and Mo) carbides contributing to marked enhancement in abrasion resistance. Besides and desirably, the resultant composite MC carbide approaches the specific gravity of the hot melt and hence produces no segregation. Attaining such advantages requires Nb to be added in a content of not less than 0.5%, while more than 4% of Nb allows an Nb carbide to individually crystallize, promoting carbide segregation. V; 4–6% and Nb; 1–2% are particularly preferred.

Si; Not More Than 1%

Si is added as a deoxidizing material and further for ensuring casting capabilities. An appropriate lower limit of Si is larger than 0.1%. Above 1% yields no better results, resulting in mere saturation of desirable advantages. 0.2–0.6% is particularly preferred.

Mn; Not More Than 1%

Mn is added to permit S contained in a hot melt to fix as MnS, thereby removing objectionable effects which would be exerted by S. An acceptable lower limit of Mn is not less than 0.1%. Above 1% causes desirable advantages to become saturated. 0.2–0.8% is particularly preferred.

W; Not More Than 1%

In the practice of the present invention, W is not desired since such element is not only ineffective for enhancement in abrasion resistance but also liable to promote carbide segregation. Even in the case where W is unavoidably entrapped from those starting materials used in a hot melt or the like, the content of W should be set to be not larger than 1%, preferably below 0.5%, by alteration of the hot melt materials such that adverse effects are held to an absolute minimum.

Ni; Not More Than 1.5%

Though not essential for the present invention, Ni may be useful where desired since it is capable of improved hardening and of widened working range of roll hardening. Above 1.5% produces no better results, but invites formation of unstable residual, (austenite). Thus, the content of Ni is not more than 1.5%.

Co; Not More Than 6%

Though not essential for the present invention, Co may be useful since it is effective to stabilize a metallic structure at elevated temperature and moreover to reduce thermal expansion. However, this element is less apt to improve the abrasion resistance and surface roughness resistance of the roll according to the invention and hence less conducive to enhanced characteristics of the roll. Thus, Co is set at 6% in its upper limit from the economical point of view.

B; Not More Than 0.1%

B may be used since it serves to enhance hardening, thereby facilitating temperature controlling. However, because above 0.1% allows roll materials to become brittle, the upper limit of B is set to be not more than 0.1%.

(3) Details of the production of the roll according to the present invention are defined as follows:

Inner Layer; Spherical Graphite Cast Iron or Graphite Steel

It is desired that a highly strong material of excellent casting and working qualities be employed to form an inner layer. With practical applicability taken in view, a spherical graphite cast iron may preferably be selected in producing a solid roll, and a graphite steel may preferably be selected in producing a cylindrical sleeve roll.

Arrangement of Intermediate Layer

When an outer layer and an inner layer of the roll according to the invention are brought into directly integrally melt-bonded relation to each other, alloy components of the outer layer are admixed into the inner layer so that the inner layer would sometimes become hard and brittle. This is particularly conspicuous in the case of an inner layer of a spherical graphite cast iron. To avoid the alloy components of the outer layer against admixture into the inner layer, an intermediate layer may desirably interposed therebetween. While components for use in the intermediate layer do not need to be strictly defined, alloy elements such as Cr, Mo, V, Nb and so on in smaller contents in the intermediate layer than in the outer layer. This ensures that the inner layer is prevented from becoming hard and brittle upon intermixing with the alloy components transferred from the outer layer. Also desirably, a hot melt of the intermediate layer may contain C in an amount of not less than 0.5% and Si in an amount of not less than 0.5%, thereby achieving reliable casting.

(4) In a composite roll (product) according to the present invention, both the intermediate and inner layers would contain alloy elements in large amounts as a result of intermixture with those alloy components having come out of an outer layer. Each of the layers so highly alloyed becomes brittle, eventually rendering the resultant roll breakable. Accordingly and preferably, alloy compositions for each of the layers in the composite roll should be defined as follows:

Intermediate Layer
C; 0.8–3.0%, Si; 0.3–3.0%, Mn;≦1.5% Ni;≦5%, Cr;≦10%, Mo;≦4%, V;≦5% and Nb;≦3%

Inner Layer
C; 2.5–4.0%, Si; 1.5–3.5%, Mn;≦1.5% Ni;≦5%, Cr;≦3%, Mo;≦3%, V;≦3% and Nb;≦2%

(B) Reasons for Restriction Imposed upon Alloy Elements for Inner and Intermediate Layers In the composite roll (three-layered roll) according to the present invention, metallurgical bonding is performed between an outer and an intermediate layer and between an intermediate and an inner layer. To this end, it is essential to intermix the outer layer on its inside with intermediate layer materials and also to intermix the intermediate on its inside with inner layer materials. However, care should be taken to preclude the outer layer against admixture into the intermediate and inner layers to such an excessive extent as to diminish excellent toughness qualities of the latter two layers. In this invention, the intermediate layer is arranged to prevent the outer layer from admixture into the inner layer. Despite this arrangement, the outer layer would still transfer into the inner layer through such intermediate layer.

In the present invention, it has been found that the ratio of outer layer admixed into intermediate layer material is most preferred to be in the range of 5–50%. Smaller ratios than 5% tend to bring about cast faults such as unbonded portions, inclusions or the like at a boundary between the outer and intermediate layers, thus failing to warrant complete bonding at that boundary. Larger ratios than 50% allow carbide-forming elements (especially Cr) to be contained in the inner layer, inviting impaired toughness of the latter.

Another finding is that the ratio of intermediate layer material admixed into inner layer material is that a ratio of intermediate layer admixed into inner layer material is most preferably set to be in the range of 5–20%. Below 5% tends to leave cast faults such as unbonded portions, inclusions or the like at a boundary between the intermediate and inner layers, consequently failing to ensure complete bonding at that boundary. Inversely, above 20% results in saturation of desirable bonding condition between the inner layers and the intermediate layers, and above 20% causes carbide-forming elements (especially Cr) existing in the intermediate layer to admix in large amounts into the inner layer, thus suffering from sudden brittlement of the inner layer and breakage of the resultant roll.

Namely, the compositions for use in the intermediate material and in the inner layer material may be adopted with the ratio of the outer layer admixed into the intermediate layer material and the ratio of the intermediate layer admixed into the inner layer material, both ratios of which are specified above, and with consideration taken of increments of those components transferred from the outer and intermediate layers.

Acceptable compositions for the inner and intermediate layers of the roll product are defined as follows:

Inner Layer

By provision of an intermediate layer, admixture of Cr contained in an outer layer into an inner layer can be reduced to a greater extent than in the absence of such intermediate layer. It is impossible, however, to completely prevent Cr from intrusion into the inner layer. Thus, in consideration of increments of Cr, chemical components and component ratios for inner layer material should be selectively decided.

C; 2.5–4.0%

Less than 2.5% of C causes reduced amount of graphite, hence making the resultant inner layer easily susceptible to nesting. Conversely, more than 4.0% of C invites brittleness. Thus, the content of C is specified to be 2.5–4.0%.

Si; 1.5–3.5%

Less than 1.5% of Si leads to reduced amount or graphite, hence resulting in increased crystallized cementite and making the resultant inner layer hard and brittle. More than 3.5% of Si suffers from excessive graphite and brings about impaired strength. Thus, the content of Si is specified to be 1.5–3.5%.

Mn; Not More Than 1.5%

Mn is effective to avoid adverse effects flowing from S. Since above 1.5% is apt to invite brittleness, the content of Mn is specified to be not more than 1.5%. Below 0.3% is too small for that purpose.

Ni; Not More Than 5.0%

Ni serves to bring about increased strength. Since above 5.0% yields no better results, the content of Ni is specified to be not more than 5.0%.

Cr; Not More Than 3%

Cr necessarily intrudes in some amount into the inner layer even in the case of arrangement of an intermediate layer. The better, the smaller content of Cr. A tolerable content of Cr is up to 3%. Above 3% causes an increase in cementite and hence a sudden decline in strength and toughness.

Mo; Not More Than 3%

Mo is effective in increasing the hardness of the associated substrate. Since above 3% involves brittleness and moreover uneconomy, Mo is specified to be not more than 3% in its content.

V; Not More Than 3% and Nb; Not More Than 2%

Nb and V act to uniformly disperse fine carbides, thus enhancing the strength of the inner layer. Improvement can also be made in the abrasion resistance of a roll axis formed by use of the inner layer. More than 3% of V and more than 2% of Nb make an inner layer insufficiently castable and, if castable, considerably brittle. Thus, the contents of V and Nb are specified as noted above.

Co; Not More Than 6%

Co is effective to reduce thermal expansion, thereby preventing the finished roll from getting broken due to thermal stress. More than 6% produces no better results. Thus, Co is specified to be 6% in its upper limit.

P; Not More Than 0.1%

P is an impurity. Above 0.1% makes the resultant material brittle.

S; Not More Than 0.04%

S should be held to a minimum because it poses an obstacle in causing graphite to become spherical. An acceptable content of S is specified to be not more than 0.04%.

Intermediate Layer

An intermediate layer acts to prevent an inner layer from becoming deteriorative in regard to toughness, which inner layer would receive carbide-forming elements (especially Cr) having transferred from the corresponding outer layer.

C; 0.8–3.0%

C melts into an intermediate layer substrate, thereby ensuring strength. Below 0.8% of C is too small for such advantage to be obtained. Inversely, above 3.0% gives rise to increased carbide and improved toughness. The content of C is specified to be 0.8–3.0%.

Si; 0.3–3.0%

Si should be used in a content of larger than 0.3% in order to avoid undesirable brittleness owing to hardening and to ensure reliable casting. No better results cannot be obtained even when Si is added in a content of above 3.0%. Thus, the content of Si is specified to be 0.3–3.0%.

Mn; Not More Than 1.5%

Mn is effective to improve the strength of the resulting material. Since above 1.5% results in saturation of desirable advantages, the content of Mn is specified to be not more than 1.5%.

Ni; Not More Than 5%

Ni is effective to ensure strength and toughness. Since above 5% produces no better results, the content of Ni is specified to be not more than 5%.

Cr; Not More Than 10%

Cr should desirably be held to a minimum because it forms carbides and hence makes the resultant material brittle. The content of Cr is specified to be not more than 10% even when the outer layer is formulated to have a considerably high content of Cr.

Mo; Not More Than 4%

Mo is an element important, like Ni, for ensuring toughness. Above 4% is responsible for brittleness. Thus, the content of Mo is specified to be not more than 4%.

V; Not More Than 5% and Nb; Not More Than 3%

V and Nb act to render the resultant intermediate layer highly strong. Above 5% of V and above 3% of Nb cause microstructural nesting in the intermediate layer with eventual sharp drop in strength in such layer.

Co; Not More Than 6%

Co is effective to reduce thermal expansion, thereby preventing the finished roll from getting broken due to thermal stress. More than 6% produces no better results. Thus, Co is specified to be not more than 6% in its upper limit.

P; Not More Than 0.05%

P brings about increased fluidity of the resulting hot melt and makes the resultant material brittle. The better, the smaller content of P. Below 0.05% is desirable.

S; Not More Than 0.03%

S, like P, suffers from a brittle material. The better, the smaller content of S. Below 0.03% is desirable.

Additionally, Al, Ti, Zr or the like as a deoxidizing materials may be used in an amount of not more than 0.1%. When the compositions of an intermediate layer and of an inner layer are solidified to meet with the requirements specified above, each of an intermediate layer and an inner layer can be attained with excellent material characteristics.

Furthermore, the present invention is advantageous in that because of V and Nb admixtured from the outer layer into the inner layer, a spherical graphite cast iron or a graphite steel used in the inner layer is more improved in respect of mechanical properties than that for general use. Consequently, the roll according to the invention is applicable to rolling under a high loading than conventional rolls.

Measuring Methods of Carbide Areas

In the roll materials according to the present invention, a carbide such as MC, $M_7C_3$, $M_2C$, or $M_6C$ is contained. Owing to a large content of Cr, $M_3C$ is not almost present.

Methods of identification of carbides and measurement of the contents (areas) of carbides according to the present invention are given below.

1. Measurement of Overall Contents (Areas) of Carbides

A surface of a specimen is mirror-polished, followed by immersion of the specimen in an alcohol solution of 5% nitric acid, an alcohol solution of hydrochloric acid-picric acid or an aqua regia, with the result a specimen substrate is corroded. Through inspection of the corroded surface by means of a optical microscope, a substrate region looks black and carbide regions white. The areas of the white regions are measured by an image analyzer to thereby determine the overall contents (areas). If the substrate region does not become sufficiently black-colored even after corrosion, then the corroded surface is painted black in solid condition with a black pencil. Subsequent gentle wiping the painted surface with gauze or the like provides a vivid contrast of black color (substrate) to white color (carbide).

2. Measurement of Content (Area) of MC Type Carbide

A MC type carbide as mirror-polished (not etched) looks grey on examination by optical microscope. The area of a grey region is measured by an image analyzer to thereby determine the content (area) of the MC type carbide.

3. Measurement of Contents (Areas) of $M_2C$ and $M_6C$ Type Carbides

A surface of a specimen is mirror-polished, followed by corrosion of the specimen for 3–5 seconds with use of Murakami reagent (an aqueous solution prepared by adding potassium hydroxide; 10 g and potassium ferricyanide; 10 g to 100 ml of water), with the result that $M_2C$ and $M_6C$ type carbides develop black. The areas of black regions are measured by an image analyzer to thereby determine the contents (areas) of the $M_2C$ and $M_6C$ type carbides.

4. Measurement of Content (Area) of $M_7C_3$ Type Carbide (content of $M_7C_3$ type carbide)=(overall content of carbides)−(content of MC type carbide+contents of $M_2C$ and $M_6C$ type carbides)

5. Total Content (Area) of MC Type Carbide and $M_7C_3$ Type Carbide (total content of MC type carbide and $M_7C_3$ type carbide)=(overall content of carbides)−(contents of $M_2C$ and $M_6C$ type carbides)

6. In outer layer components of the roll according to the present invention, the contents of $M_2C$ and $M_6C$ type carbides increase as the composition is of a higher Cr—Mo type. However, segregation or other inconveniences do not take place so long as overall carbide content does not exceed 40%.

EXAMPLES

Figure 5:
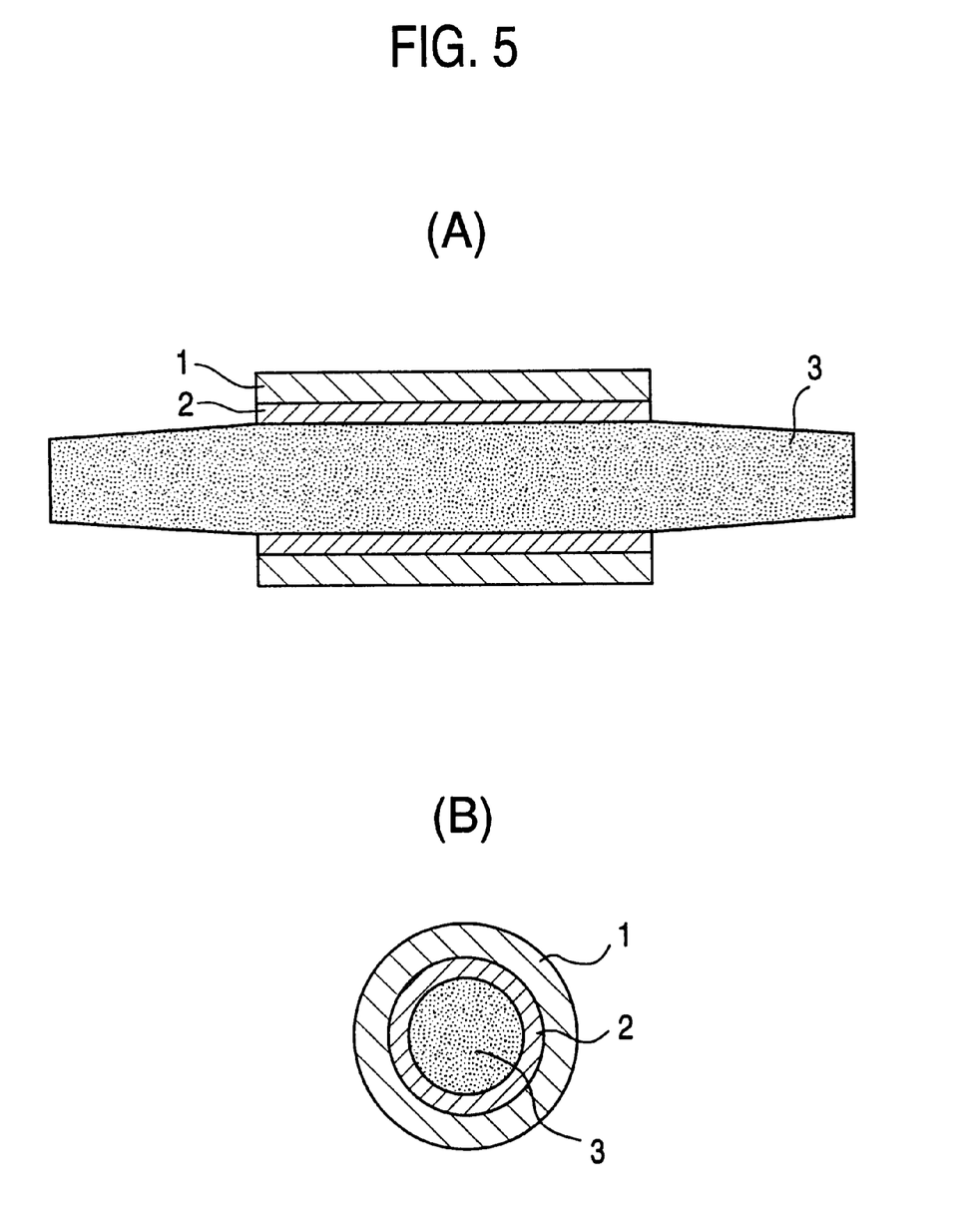

The roll of the present invention produced by means of centrifugal casting is constructed in accordance with the the foregoing detailed description. This production method will now be illustrated with reference to a form of the roll shown in FIG. 5.

Firstly, a hot melt for formation of an outer layer 1 is poured into a metallic casting mold coated interiorly with a refractory material and rotating on a centrifugal casting machine, followed by casting of an intermediate layer 2 over an inner surface of the outer layer 1. Upon complete solidification of both materials, i.e., the outer layer 1 and the intermediate layer 2, the casting mold is disposed in a vertical posture, and an inner layer 3 is cast from the top. The outer layer 1, the intermediate layer 2 and the inner layer 3 are brought into metallurgically bonded relation to one another so that an integral roll is provided. Even before the outer layer 1 and the intermediate layer 2 are not completely solidified, the inner layer 3 may be cast in a suitable manner with the first two layers disposed in a horizontal or slant state, which two layers are left internally partially unsolidified.

Example 1

A specimen of 100 mm in thickness was centrifugally cast, as corresponding to an outer layer of a roll, with use of a hot melt of the chemical composition shown in Table 1. The presence or absence of carbide segregation was decided by cross-sectionally examining the specimen structure. Next, hardening was conducted at from 1050° C. and annealing at 550° C., and a test piece for use in measuring carbide areas and a test piece for use in measuring abrasion wear were prepared. To determine the carbide areas, carbides of greater than 1 μm in maximum diameter was quantitatively measured by means of an image analyzer. Abrasion testing was done by a two-disc slip system in which the mating material (S45C) was used together with the test piece. The mating material was heated at 900° C., and the test piece was rotated at 800 rpm with water cooling. The mating material and the test piece were press-contacted with each other at a load of 100 kg for 15 minutes with a slip ratio between both test materials preset at 14.2%. This test was repeated 12 times with the mating material varied, after which the abrasion wear of the test piece was measured.

Figure 1A:
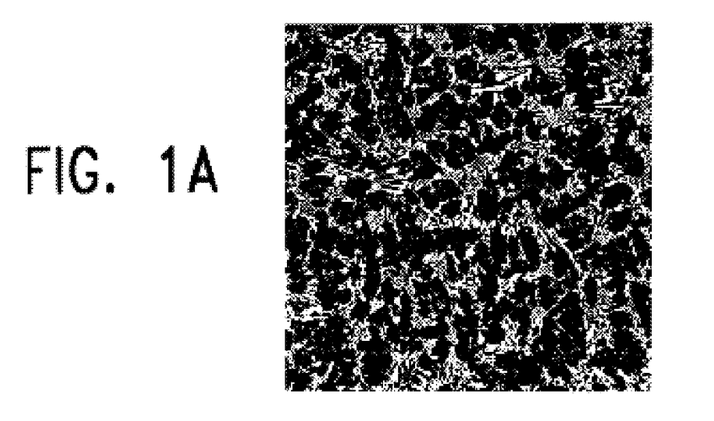
FIG. 1(a) is a micrograph representing a metallic structure (a carbide structure) of the roll material provided by the present invention and seen 20 mm apart from a surface of such material, (b) being that of such structure as seen 30 mm apart from the surface, and (c) being that of such structure as seen 40 mm apart from the surface.
Figure 1B:
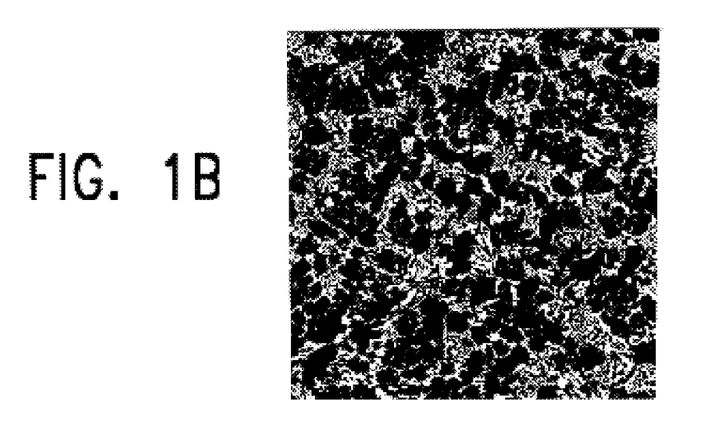
Figure 1C:
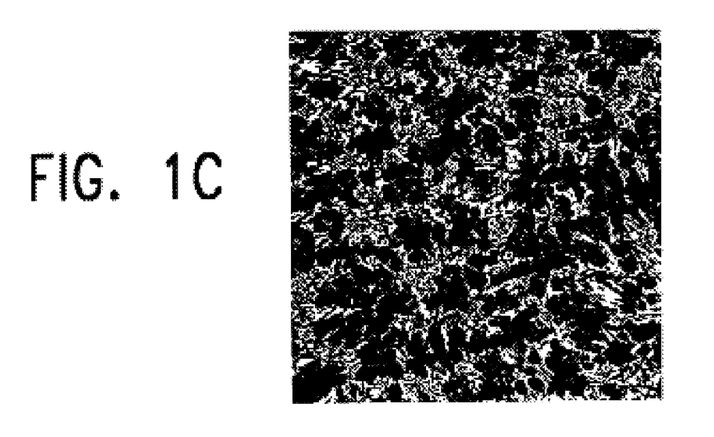
Figure 2A:
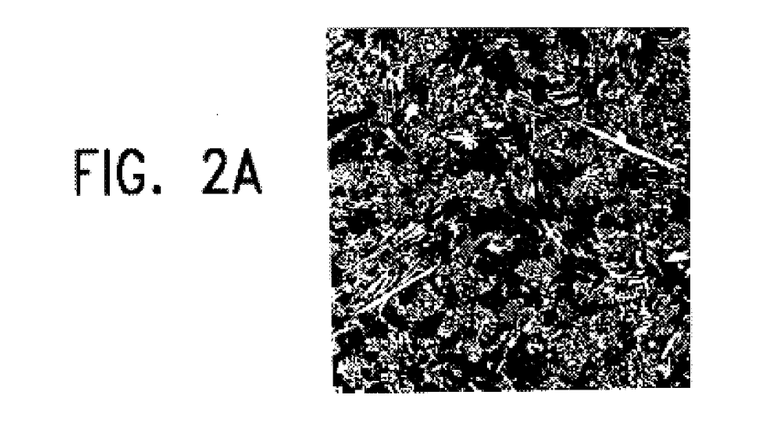
FIG. 2(a) is a micrograph representing a metallic structure (a carbide structure) of a comparative roll material and seen 20 mm apart from a surface of such material, (b) being that of such structure as seen 30 mm apart from the surface, and (c) being that of such structure as seen 40 mm apart from the surface.
Figure 2B:
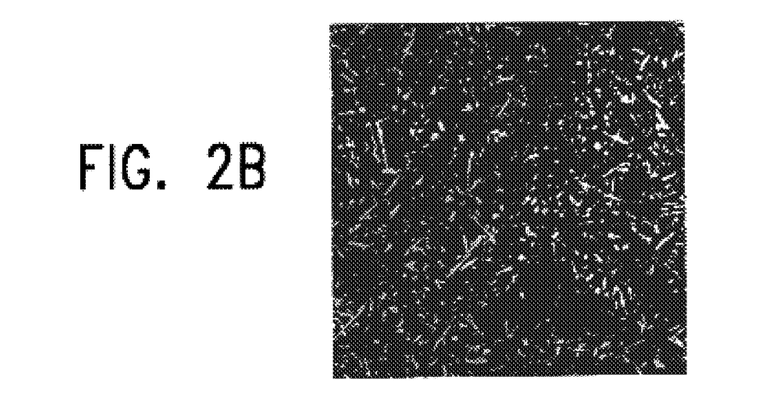
Figure 2C:
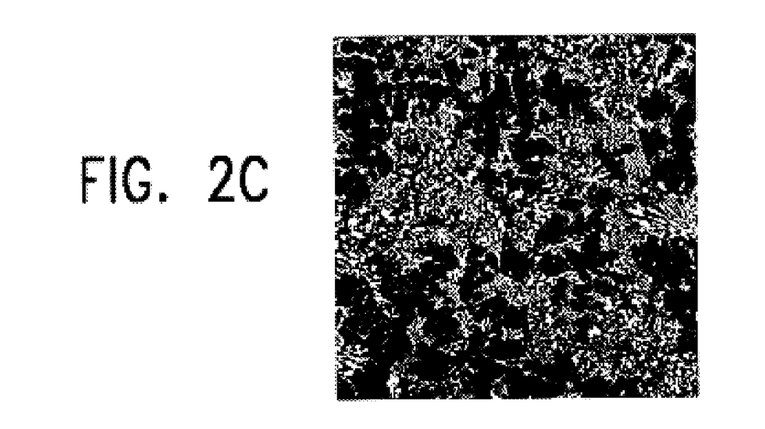

As one example concerning the presence or absence of carbide segregation, a carbide structure of an inventive material (A-9) of the present invention is shown in FIGS. 1(a), (b) and (c), whereas a carbide structure (C-8) of a comparative material is shown in FIGS. 2 (a), (b) and (c). In the inventive material, carbides looking white have got dispersed uniformly in the direction of thickness of the test piece. This means a structure suited for a rolling roll. On the other hand, in the comparative material containing much C or much Cr, a needle-like carbide and a colony-like carbide have become separately segregated in the direction of thickness. Use of this comparative material for a rolling roll leads to impaired surface quality of the finished rolled steel plate.

Figure 3:
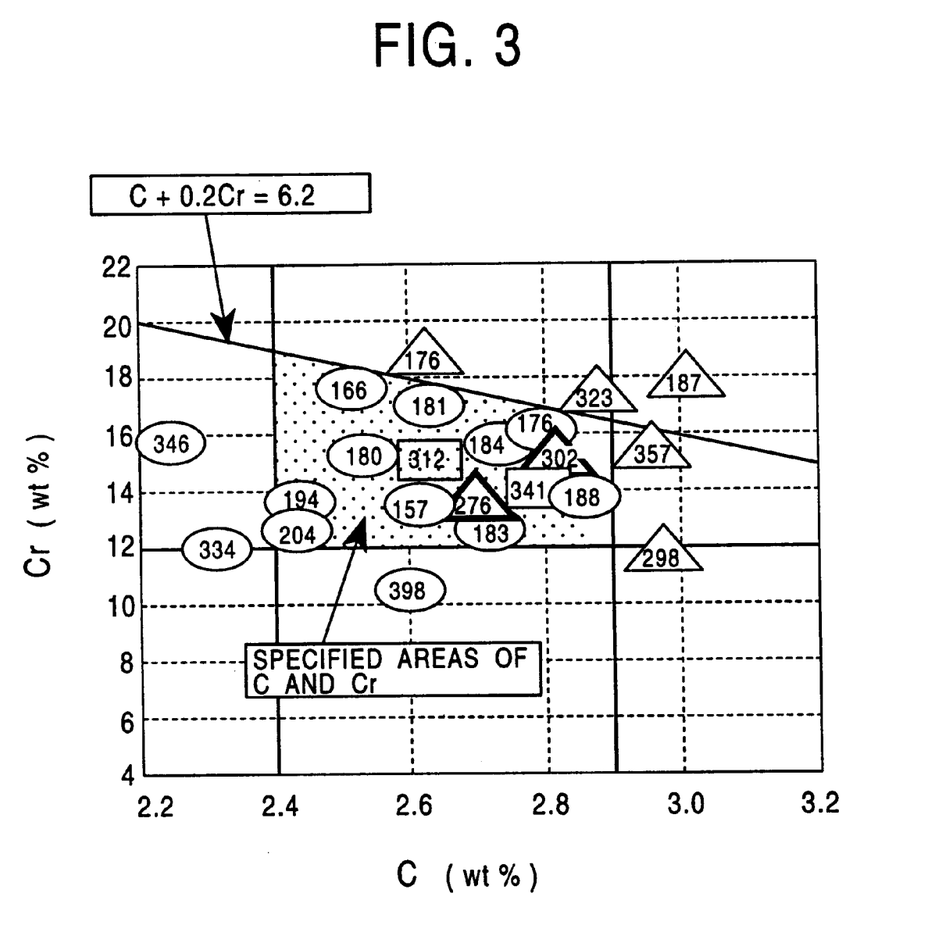
FIG. 3 graphically represents the relationship between the amounts of C and Cr, the carbide segregations of whether present or absent, and the abrasion wear values as concerns test specimens.

In Table 2 and FIG. 3, the presence or absence of carbide segregation and the abrasion wear as regars each specimen are shown. In FIG. 3, the mark ○ refers to the absence of carbide segregation, the mark □ to the presence of carbide segregation in a W-containing material, and the mark Δ to the presence of carbide segregation in a material of Mo/Cr>0.7. Moreover, the numerical value parenthesized denotes an abrasion wear (mg).

Inventive materials A-1–A-15 are free of carbide segregation and markedly excellent in respect of abrasion resistance.

Comparative materials B-1 and B-2 are beyond the component range specified by the present invention in regard to too high a content of Mo and are outside the range of the invention also in regard to Mo/Cr. Carbide segregation took place with reduced abrasion resistance.

Comparative materials C-1–C3 are outside the component range specified by the invention in regard to too small a content of C or Cr and moreover are outside the specified range in regard to too small contents of carbides. Though no carbide segregation was observed, abrasion resistance sharply declined. Comparative material C-1 is outside the range specified by the invention also in regard to too small a content of Mo/Cr.

Comparative material C-4 is outside the range specified by the invention in regard to too small a content of Mo/Cr. Though carbides did not segregate, abrasion resistance sharply declined.

Comparative materials C-5–C8 are outside the component range specified by the invention in regard to too large a content of C or Cr. Carbide segregation was observed. In particular, comparative material C-6 is outside the range specified by the invention also in regard to too small a content of Mo and is outside the range of the invention also in regard to Mo/Cr. Abrasion resistance sharply declined.

Comparative material C-9 caused carbide segregation since a value of C+0.2 Cr exceeded 6.2 and revealed a sudden drop in abrasion resistance owing to insufficiency in Mo and Mo/Cr.

Comparative material D-1–D-2 contained W and hence fell outside the component range of the invention. Carbide segregation occurred with impaired abrasion resistance.

Example 2

A Y-shaped keel block of 30 mm in thickness was prepared with use of a hot melt of the chemical composition tabulated in Table 3 in which Mo/Cr was varied with different contents of Mo in a 2.8 C-15 Cr type composition. Hardening was conducted at from 1050° C. and annealing at 550° C. By examination of a specimen structure, the presence or absence of a needle-like carbide was decided from which segregation resulted. Abrasion testing was done by a two-disc slip system in which the mating material (S45C) was used together with the test piece. The mating material was heated at 900° C., and the test piece was rotated at 800 rpm with water cooling. The mating material and the test piece were press-contacted with each other at a load of 100 kg for 15 minutes with a slip ratio between both test materials preset at 14.2%. This test was repeated 12 times with the mating material varied, after which the abrasion wear of the test piece was measured. The abrasion wear of and the presence or absence of each specimen are tabulated in Table 4. Inventive materials (No. 3–5) show conspicuously excellent abrasion resistance without involving needle-like carbides. In contrast, comparative materials (No. 1, 2) having a Mo/Cr content of smaller than 0.27 revealed a sharp drop in abrasion resistance, and comparative material (No. 6) having too large a content of Mo has proved to develop needle-like carbides and reduce abrasion resistance.

Example 3

An outer layer material, an intermediate layer material and an inner layer material listed in Table 5 and related to an inventive roll and comparative roll 1 were melted. A composite roll was produced by the following procedure, which rolled was sized to be 670 mm in cylindrical diameter and 1450 mm in cylindrical length. The outer layer material was cast into a casting mold rotating at a centrifugal force of 140 G such that an outer layer was formed with a thickness of 75 mm. Immediately after the outer layer was solidified, an amount of an intermediate layer material corresponding to a thickness of 40 mm was cast over an inner surface of the outer layer. Thereafter, such inner surface was again melted and integrally melt-bonded to an intermediate layer. Upon solidification of the intermediate layer, the casting mold was caused to stop rotation, an inner layer was cast. Integral melt bonding an outer layer-intermediate layer-inner layer structure was carried out. After the outer layer was cooled at 60° C. or lower at its surface temperature, the casting mold was dismantled.

Comparative Roll

Comparative roll 1 is a roll outside the range specified by the present invention in regard to too large contents of C and Cr and outside the specified range in regard to a carbide area (a total of MC and $M_7C_3$) of 32.4% in the outer layer. After dismantling of the casting mold, comparative roll 1 suffered from breakage out of the inner layer while in standing. Comparative rolls 2 and 3 are a roll made of a Ni-grain cast iron and a high-speed steel roll of a conventional composition, respectively, and both rolls have been produced by centrifugal casting and are made commercially available.

Inventive Roll

After dismantling of the casting mold, the roll of the present invention was heat-treated with hardening at from 1050° C., followed by annealing at 500° C. Upon completion of the heat treatment, inspection was made by supersonic flaw detection and the like so that no flaws such as nests were found on the intermediate layer and its neighborhood, and the inner structure was found satisfactory.

Figure 4:
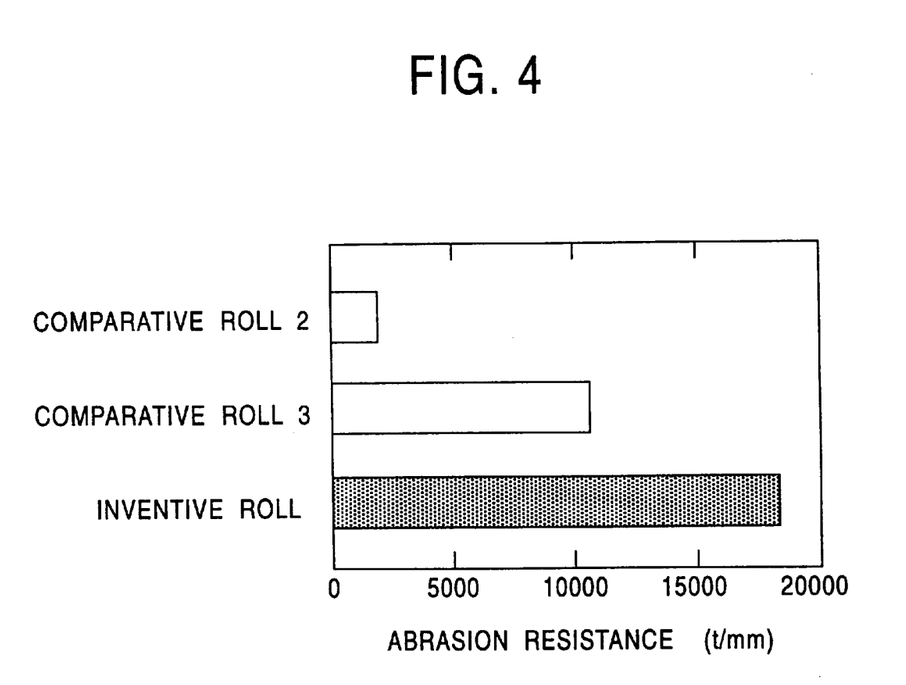
FIG. 4 graphically represents the rolling performance results of the roll according to the invention and of rolls for purposes of comparison.

In FIG. 4, there are shown the results obtained by application of the above inventive roll and comparative roll at an actual finish mill for hot rolling. The abscissa axis of FIG. 4 denotes abrasion resistance represented by the rolling amount of a steel plate based on the wastage amount (abrasion wear+grinding amount) of 1 mm in roll diameter. The inventive roll shows abrasion resistance to a by far remarkably great extent than comparative rolls 2 and 3 and further produces significantly good results without inviting roll surface roughening.

Example 4

An intermediate layer material of and an inner layer material of the compositions listed in Table 6 (the analytical results of an outer layer being the results of chemical analysis of a roll product) and related to an inventive roll were melted. A composite roll was produced by the following procedure, which rolled was sized to be 670 mm in cylindrical diameter and 1450 mm in cylindrical length.

(1) A hot melt of an outer layer as equivalent to a thickness of 75 mm was cast into a casting mold rotating at a centrifugal force of 140 G.

(2) Upon lapse of 11–15 minutes after completion of the outer layer material, an amount of the intermediate layer material as equivalent to a thickness of 40 mm was cast over an inner surface of the outer layer. Such inner surface was again melted and integrally melt-bonded to an intermediate layer.

(3) Upon lapse of 40–46 minutes after completion of the outer layer material, the rotation of the casting mold was brought to an end, followed by casting of the inner layer material, so that an outer layer-intermediate layer-inner layer structure was integrally melt-bonded.

(4) The outer layer was cooled at 60° C. or lower at its surface temperature, after which the casting mold was dismantled.

(5) Heat treatment was conducted with hardening at from 1000° C. and annealing at 500° C.

With regard to each roll, heat treatment was completed with no breakage caused. Additionally, no flaws such as nests were present on the intermediate layer and in the vicinity thereof as a result of supersonic flaw detection of the roll body, and the inner structure was acceptable. Then, each roll was cut at one of its ends to inspect the chemical compositions of the outer and intermediate layers at their portions located centrally in the direction of thickness and the chemical composition of the inner layer (at a portion located 30 mm inside from a boundary between the intermediate-inner layers). Tensile strength was also measured. Table 7 lists those chemical compositions and tensile strengths. The chemical compositions of the intermediate and inner layers of the roll produced in accordance with the present invention are within the desired ranges stated hereinabove. The tensile strength of each layer is greater than 500 Mpa that is sufficient for a composite roll.

With regard to inventive rolls A, B and C of the compositions shown in Tables 6 and 7, high-quality rolls can be produced by means of centrifugal casting. To this end, an outer layer is formed with use of optimized alloy components and specified carbide compositions. Such outer layer is markedly excellent in abrasion resistance, highly economical and free of carbide segregation even in the case of production by centrifugal casting. An inner layer is derivable by use of a ductile cast iron that is most tough among cast iron type materials. An intermediate layer is interposed between the outer and inner layers, and all the layers are integrally metallurgically bonded to one another.

TABLE 1

| No. | C | V | Nb | Cr | Mo | Si | Mn | W | Co | Ni | B | Mo/Cr | C + 0.2 Cr |
|---|---|---|---|---|---|---|---|---|---|---|---|---|---|
| A-1 | 2.42 | 6.03 | 1.92 | 12.7 | 7.31 | 0.51 | 0.70 | — | — | — | — | 0.58 | 4.96 |
| A-2 | 2.44 | 4.82 | 1.61 | 13.6 | 6.06 | 0.81 | 0.31 | — | — | — | — | 0.45 | 5.16 |
| A-3 | 2.53 | 4.89 | 1.58 | 15.3 | 5.92 | 0.76 | 0.31 | — | — | — | — | 0.39 | 5.59 |
| A-4 | 2.51 | 4.61 | 1.83 | 17.6 | 4.93 | 0.61 | 0.31 | — | — | — | — | 0.28 | 6.03 |
| A-5 | 2.62 | 5.28 | 1.02 | 13.5 | 7.38 | 0.38 | 0.33 | — | — | — | — | 0.55 | 5.32 |
| A-6 | 2.63 | 4.17 | 2.30 | 17.2 | 5.83 | 0.35 | 0.31 | — | — | — | — | 0.34 | 6.07 |
| A-7 | 2.72 | 5.23 | 1.47 | 12.8 | 7.56 | 0.28 | 0.35 | — | — | — | — | 0.59 | 5.28 |
| A-8 | 2.74 | 6.20 | 0.98 | 15.7 | 6.56 | 0.45 | 0.28 | — | — | — | — | 0.42 | 5.88 |
| A-9 | 2.80 | 6.02 | 1.69 | 16.1 | 6.44 | 0.30 | 0.40 | — | — | — | — | 0.40 | 6.02 |
| A-10 | 2.86 | 5.34 | 1.72 | 13.9 | 6.61 | 0.32 | 0.33 | — | — | — | — | 0.48 | 5.64 |
| A-11 | 2.50 | 6.87 | 2.33 | 12.6 | 4.40 | 0.34 | 0.38 | — | — | — | — | 0.35 | 5.02 |
| A-12 | 2.61 | 5.30 | 1.04 | 13.2 | 7.07 | 0.41 | 0.32 | — | 4.80 | 0.81 | — | 0.54 | 5.25 |
| A-13 | 2.53 | 4.98 | 1.32 | 12.7 | 5.50 | 0.42 | 0.41 | — | — | 0.40 | 0.04 | 0.43 | 5.07 |
| A-14 | 2.61 | 5.11 | 1.48 | 13.2 | 6.11 | 0.38 | 0.40 | — | — | — | 0.06 | 0.46 | 5.25 |
| A-15 | 2.52 | 4.16 | 1.51 | 14.4 | 6.72 | 0.42 | 0.38 | — | — | 0.60 | — | 0.47 | 5.40 |
| B-1 | 2.82 | 5.01 | 1.47 | 15.2 | 11.10 | 0.87 | 0.46 | — | — | — | — | 0.73 | 5.86 |
| B-2 | 2.70 | 5.33 | 1.32 | 13.8 | 10.44 | 0.85 | 0.45 | — | — | — | — | 0.76 | 5.46 |
| C-1 | 2.22 | 6.14 | 1.53 | 15.8 | 2.68 | 0.31 | 0.33 | — | — | — | — | 0.17 | 5.38 |
| C-2 | 2.31 | 6.24 | 1.39 | 12.1 | 3.52 | 0.51 | 0.63 | — | — | — | — | 0.29 | 4.73 |
| C-3 | 2.60 | 5.17 | 1.46 | 10.7 | 3.10 | 0.48 | 0.52 | — | — | — | — | 0.29 | 4.74 |
| C-4 | 2.42 | 5.04 | 1.51 | 14.2 | 3.00 | 0.67 | 0.47 | — | — | — | — | 0.21 | 5.26 |
| C-5 | 2.62 | 5.34 | 1.52 | 19.1 | 7.80 | 0.42 | 0.48 | — | — | — | — | 0.41 | 6.44 |
| C-6 | 2.96 | 5.57 | 1.34 | 15.7 | 2.48 | 0.42 | 0.48 | — | — | — | — | 0.16 | 6.10 |
| C-7 | 2.97 | 5.36 | 1.48 | 12.1 | 5.48 | 0.87 | 0.49 | — | — | — | — | 0.45 | 5.39 |
| C-8 | 3.01 | 4.02 | 1.56 | 18.1 | 6.21 | 0.42 | 0.48 | — | — | — | — | 0.34 | 6.63 |
| C-9 | 2.88 | 6.02 | 1.78 | 17.6 | 2.80 | 0.41 | 0.49 | — | — | — | — | 0.16 | 6.40 |
| D-1 | 2.62 | 5.57 | 1.42 | 15.2 | 3.17 | 0.80 | 0.45 | 6.03 | | | | 0.21 | 5.66 |
| D-2 | 2.79 | 6.06 | 1.38 | 14.3 | 6.26 | 0.79 | 0.47 | 5.76 | | | | 0.44 | 5.65 |

TABLE 2

| | Carbide area | | | | |
|---|---|---|---|---|---|
| No | MC + M7C3 | M7C3 | Abrasion wear, mg | Carbide segregation | Class |
| A-1 | 13.8 | 6.9 | 204 | Absent | Inventive roll material |
| A-2 | 15.3 | 10.7 | 194 | Absent | Inventive roll material |
| A-3 | 19.6 | 15.0 | 180 | Absent | Inventive roll material |
| A-4 | 23.7 | 19.2 | 166 | Absent | Inventive roll material |
| A-5 | 16.8 | 12.1 | 181 | Absent | Inventive roll material |

TABLE 2-continued

| | Carbide area | | | | |
|---|---|---|---|---|---|
| No | MC + M7C3 | M7C3 | Abrasion wear, mg | Carbide segregation | Class |
| A-6 | 29.1 | 23.2 | 157 | Absent | Inventive roll material |
| A-7 | 18.2 | 13.4 | 183 | Absent | Inventive roll material |
| A-8 | 19.6 | 14.2 | 184 | Absent | Inventive roll material |
| A-9 | 26.3 | 19.7 | 176 | Absent | Inventive roll material |
| A-10 | 21.9 | 14.9 | 188 | Absent | Inventive roll material |
| A-11 | 16.6 | 10.4 | 231 | Absent | Inventive roll material |
| A-12 | 16.2 | 11.5 | 183 | Absent | Inventive roll material |
| A-13 | 22.4 | 17.5 | 185 | Absent | Inventive roll material |
| A-14 | 24.1 | 17.8 | 182 | Absent | Inventive roll material |
| A-15 | 21.5 | 16.6 | 193 | Absent | Inventive roll material |
| B-1 | 21.2 | 16.6 | 276 | Present | Comparative roll material |
| B-2 | 18.6 | 13.8 | 302 | Present | Comparative roll material |
| C-1 | 12.7 | 7.0 | 346 | Absent | Comparative roll material |
| C-2 | 11.4 | 5.7 | 349 | Absent | Comparative roll material |
| C-3 | 12.2 | 8.6 | 398 | Absent | Comparative roll material |
| C-4 | 16.9 | 12.2 | 354 | Absent | Comparative roll material |
| C-5 | 26.7 | 21.8 | 176 | Present | Comparative roll material |
| C-6 | 22.4 | 17.4 | 357 | Present | Comparative roll material |
| C-7 | 18.2 | 13.3 | 298 | Present | Comparative roll material |
| C-8 | 31.2 | 24.3 | 187 | Present | Comparative roll material |
| C-9 | 27.2 | 21.6 | 323 | Present | Comparative roll material |
| D-1 | 20.8 | 15.7 | 312 | Present | Comparative roll material |
| D-2 | 21.4 | 16.0 | 341 | Present | Comparative roll material |

TABLE 3

| No | C | V | Nb | Cr | Mo | Si | Mn | Mo/Cr | C + 0.2 Cr |
|---|---|---|---|---|---|---|---|---|---|
| 1 | 2.78 | 4.96 | 1.61 | 14.8 | 2.49 | 0.46 | 0.33 | 0.17 | 5.74 |
| 2 | 2.82 | 5.21 | 1.62 | 14.7 | 3.38 | 0.46 | 0.33 | 0.23 | 5.76 |
| 3 | 2.76 | 5.07 | 1.68 | 15.3 | 4.52 | 0.42 | 0.32 | 0.30 | 5.82 |
| 4 | 2.77 | 5.30 | 1.58 | 14.7 | 6.57 | 0.45 | 0.31 | 0.45 | 5.71 |
| 5 | 2.81 | 5.03 | 1.57 | 14.6 | 8.41 | 0.39 | 0.29 | 0.58 | 5.73 |
| 6 | 2.83 | 5.22 | 1.58 | 14.5 | 10.43 | 0.48 | 0.31 | 0.72 | 5.73 |

TABLE 4

| No | Abrasion wear, mg | Needle-like carbide | Class |
|---|---|---|---|
| 1 | 347 | Absent | Comparative roll material |
| 2 | 304 | Absent | Comparative roll material |
| 3 | 195 | Absent | Inventive roll material |
| 4 | 186 | Absent | Inventive roll material |
| 5 | 167 | Absent | Inventive roll material |
| 6 | 287 | Present | Comparative roll material |

TABLE 5

| Roll | Cast material | C | V | Nb | Cr | Mo | Ni | Si | Mn | Mg | Co | W | Mo/Cr | C + 0.2 Cr |
|---|---|---|---|---|---|---|---|---|---|---|---|---|---|---|
| Inventive roll | Outer layer material | 2.68 | 5.18 | 1.42 | 13.7 | 6.58 | 0.12 | 0.38 | 0.33 | — | — | — | 0.48 | 5.42 |
| | Intermediate layer material | 1.40 | — | — | — | — | — | 1.80 | 0.41 | — | — | — | — | — |
| | Inner layer material | 3.41 | — | — | — | — | 1.18 | 2.34 | 0.45 | 0.07 | — | — | — | — |
| Comparative roll 1 | Outer layer material | 2.98 | 5.20 | 1.53 | 18.2 | 7.64 | 0.10 | 0.35 | 0.34 | — | — | — | 0.42 | 0.62 |
| | Intermediate layer material | 3.42 | — | — | — | — | — | 1.80 | 0.41 | — | — | — | — | — |
| | Inner layer material | 3.42 | — | — | — | — | 1.20 | 2.41 | 0.46 | 0.07 | — | — | — | — |
| Comparative roll 2 | Outer layer material | 3.45 | — | — | 1.8 | 0.5 | 4.5 | 0.8 | 0.8 | — | — | — | 0.28 | 3.81 |
| Comparative roll 3 | Outer layer material | 2.9 | 5.0 | 1.0 | 7.0 | 3.0 | — | 0.3 | 0.3 | — | — | 4.0 | 0.43 | 4.3 |

TABLE 6

| Roll | Cast material | C | Si | Mn | Ni | Cr | Mo | V | Nb | W | Co | Mg | Mo/Cr | C + 0.2 Cr |
|---|---|---|---|---|---|---|---|---|---|---|---|---|---|---|
| Invention A | Outer layer | 2.43 | 0.52 | 0.48 | 1.21 | 12.6 | 6.52 | 4.80 | 1.23 | — | 4.62 | — | 0.52 | 4.95 |
| | Intermediate layer | 1.8 | 1.5 | 0.4 | 0.6 | — | — | 0.5 | — | — | — | — | | |
| | Inner layer | 3.0 | 2.6 | 0.5 | 1.1 | — | — | — | — | — | — | 0.068 | | |
| Invention B | Outer layer | 2.67 | 0.32 | 0.31 | — | 17.1 | 6.02 | 5.18 | 0.82 | — | — | — | 0.35 | 6.09 |
| | Intermediate layer | 1.3 | 1.0 | 0.4 | 4.5 | — | — | — | — | — | 1.4 | — | | |

TABLE 6-continued

| Roll | Cast material | C | Si | Mn | Ni | Cr | Mo | V | Nb | W | Co | Mg | Mo/Cr | C + 0.2 Cr |
|---|---|---|---|---|---|---|---|---|---|---|---|---|---|---|
| Invention C | Inner layer | 3.6 | 2.4 | 0.5 | — | — | — | 0.6 | — | — | 4.0 | 0.071 | | |
| | Outer layer | 2.75 | 0.29 | 0.27 | — | 15.9 | 5.51 | 5.97 | 1.34 | 0.48 | — | — | 0.35 | 5.93 |
| | Intermediate layer | 1.0 | 2.2 | 0.4 | — | — | — | — | — | — | — | — | | |
| | Inner layer | 3.4 | 2.0 | 0.4 | — | — | — | — | — | — | — | 0.064 | | |

TABLE 7

| Roll | Cast material | C | Si | Mo | Ni | Cr | Mo | B | Nb | W | Co | Mg | Ratio of outer layer admixed into intermediate layer material (%) | Ratio of intermediate layer admixed into inner layer material (%) | Tensile strength (Mpa) |
|---|---|---|---|---|---|---|---|---|---|---|---|---|---|---|---|
| Inventive roll A | Outer layer | 2.43 | 0.52 | 0.48 | 1.21 | 12.6 | 6.52 | 4.80 | 1.23 | — | 4.62 | — | — | — | |
| | Intermediate layer | 1.94 | 1.31 | 0.42 | 0.72 | 2.80 | 1.45 | 1.44 | 0.30 | — | 1.01 | — | 22 | — | 718 |
| | Inner layer | 2.93 | 2.51 | 0.49 | 1.06 | 0.22 | 0.11 | 0.10 | 0.03 | — | 0.08 | 0.047 | — | 8 | 548 |
| Inventive roll B | Outer layer | 2.67 | 0.32 | 0.31 | — | 17.1 | 6.02 | 5.18 | 0.82 | — | — | — | — | — | |
| | Intermediate layer | 1.74 | 0.77 | 0.36 | 3.2 | 5.83 | 2.08 | 1.79 | 0.27 | — | 0.88 | — | 34 | — | 638 |
| | Inner layer | 3.40 | 2.07 | 0.48 | 0.41 | 0.63 | 0.33 | 0.70 | 0.03 | — | 3.66 | 0.051 | — | 11 | 569 |
| Inventive roll C | Outer layer | 2.75 | 0.29 | 0.27 | — | 15.9 | 5.51 | 5.97 | 1.34 | 0.48 | — | — | — | — | |
| | Intermediate layer | 1.52 | 1.63 | 0.37 | — | 4.67 | 1.61 | 1.76 | 0.41 | 0.14 | — | — | 29 | — | 692 |
| | Inner layer | 3.14 | 1.95 | 0.39 | — | 0.72 | 0.25 | 0.27 | 0.07 | 0.03 | — | 0.044 | — | 15 | 513 |

Industrial Applicability

According to the present invention, a high-quality roll is attainable by centrifugal casting of economical benefit which is capable of exhibiting abrasion resistance to a noticeably excellent extent even under strict rolling conditions recently required and also of enhancing the surface quality of a rolled steel plate. Consequently, improved productivity of a rolled steel plate and reduced production cost are possible. This invention is also applicable to a cylindrical sleeve roll.

Also according to the invention, a high-quality roll can be produced by means of centrifugal casting. In such instance, an outer layer is formed with use of optimized alloy components and specified carbide compositions. This outer layer is markedly excellent in abrasion resistance, highly economical and free of carbide segregation even in the case of production by centrifugal casting. An inner layer is derivable by use of a ductile cast iron that is most tough among cast iron type materials. An intermediate layer is interposed between the outer and inner layers, and all the layers are integrally metallurgically bonded to one another.

What is claimed is:

1. A hot-rolling roll characterized in that the roll comprises an outer layer containing, by weight, C; 2.4–2.9%, Mo; 3–9%, V; 3–8% and Nb; 0.5–4%, and with Mo, Cr and C being controlled within the limitations of both of the following equations (1) and (2) at one time, $$0.27 \leq Mo\ (\%)/Cr\ (\%) \leq 0.7 \qquad (1)$$

$$C\ (\%) + 0.2 \cdot Cr\ (\&) \leq 6.2 \qquad (2)$$

the outer layer further containing as the balance fe and unavoidable impurities.

2. A hot-rolling roll characterized in that the roll comprises an outer layer containing, by all weight ratios, C; 2.4–2.9%, Si; not more than 1%, Mn; not more than 1%, Cr; 12–18%, Mo; 3–9%, V; 3–8% and Nb; 0.5–4%, and meeting with the following equations (1) and (2) at one time, $$0.27 \leq Mo\ (\%)/Cr\ (\%) \leq 0.7 \qquad (1)$$

$$C\ (\%) + 0.2 \cdot Cr\ (\%) \leq 6.2 \qquad (2)$$

the outer layer further including one or more of Ni; not more than 1.5%, Co; not more than 6% and B; not more than 0.1%, the outer layer further containing as the balance Fe and unavoidable impurities.

3. A hot-rolling roll according to claims 1 and 2, characterized in that the outer layer further includes a MC type carbide and a $M_7C_3$ type carbide in their total area of 13–30%.

4. A hot-rolling roll according to claim 3, characterized in that the $M_7C_3$ type carbide is present in an area of not less than 6%.

5. A hot-rolling roll according to claims 1 and 2, characterized in that the roll further includes an inner layer formed of a spherical graphite cast iron or a graphite steel and held in integrally fusion-bonded relation to the outer layer, the inner layer containing, by all weight ratios, C; 2.5–4.0%, Si; 1.5–3.5%, Mn; not more than 1.5%, Cr; not more than 3%, Mo; not more than 3%, V; not more than 3% and Nb; not more than 2%, and further containing as the balance Fe and unavoidable impurities.

6. A hot-rolling roll according to claims 1 and 2, characterized in that the roll further includes an intermediate layer interposed between the outer layer and the inner layer and held in integrally fusion-bonded relation to the outer and inner layers, the intermediate layer containing, by all weight ratios, C; 0.8–3.0%, Si; 0.3–3.0%, Mn; not more than 1.5%, Cr; not more than 10%, Mo; not more than 4%, V; not more than 5% and Nb; not more than 3%, and further containing as the balance Fe and unavoidable impurities.

7. A hot-rolling roll according to claim 6, characterized in that the ratio of the intermediate layer admixed into the inner layer material is in the range of 5–20%.

8. A hot-rolling roll according to claim 6, characterized in that the ratio of the intermediate layer admixed into the outer layer material is in the range of 5–50%.

9. A hot-rolling roll according to claim 5 or 6, characterized in that either one or both layers of the inner and intermediate layer s further include either one or both components of Ni; not more than 5% and Co; not more than 6%.

10. A hot-rolling roll of according to claim 1 or 2, characterized in that the outer layer is derivable from centrifugal casting.

* * * * *

UNITED STATES PATENT AND TRADEMARK OFFICE
CERTIFICATE OF CORRECTION

PATENT NO. : 6,095,957
DATED : August 8, 2000
INVENTOR(S) : Kenji Ichino et al.

It is certified that error appears in the above-identified patent and that said Letters Patent is hereby corrected as shown below:

<u>Column 19, claim 1,</u>
Line 9, please change "C (%) + 0.2 Cr (&) $\leq$ 6.2" to -- C(%) + 0.2 Cr (%) $\leq$ 6.2 --.

Signed and Sealed this

Twelfth Day of March, 2002

Attest:

Attesting Officer

JAMES E. ROGAN
Director of the United States Patent and Trademark Office